United States Patent Office

3,401,088
Patented Sept. 10, 1968

3,401,088
PROCESS OF FERMENTATION OF CHLORTETRA-CYCLINE AND TETRACYCLINE ANTIBIOTICS
Ivan Villax, Lisbon, Portugal, assignor to International Rectifier Corporation, Los Angeles, Calif., a corporation of California
No Drawing. Continuation-in-part of application Ser. No. 141,461, July 24, 1961. This application July 22, 1966, Ser. No. 567,073
Claims priority, application Portugal, July 23, 1960, 37,424
7 Claims. (Cl. 195—114)

This application is a continuation-in-part of copending application Ser. No. 141,461, filed on July 24, 1961 and now abandoned.

The present invention relates to an improved process for the production, by submerged fermentation, of N,N'-dibenzylethylenediamine (DBED) and N,N'-lower-dialkoxydibenzylethylenediamine alkaline earth metal complexes of chlortetracycline and tetracycline, as well as to an improved process of fermentation of chlortetracycline and tetracycline, these being easily freed in pure state from those complexes.

More particularly, the invention relates to the addition of an effective amount of a compound selected from the group consisting of N,N'-dibenzylethylenediamine and a N,N'-lower-dialkoxydibenzylethylenediamine to the broth to be fermented, enhancing the formation of chlortetracycline and tetracycline, thus representing a more economical process than hitherto described.

These new derivatives possess favorable pharmacological properties such as more lasting blood levels, and, due to their very low solubility in aqueous medium, they are useful for the isolation of the active substances from any fermented broth containing tetracycline or chlortetracycline.

The use of N,N'-dibenzylethylenediamine together with magnesium ions for the recovery of tetracyclines has been claimed in Czech Patent No. 91,397, without disclosing specifically the individual complexes or their physical constants, biological activity or pharmaceutical usefulness.

The U.S. Patent 2,712,517 discloses the use of precursors, i.e., compounds metabolically convertible into the tetracycline molecules, exerting an enhancing action on the yield in the fermentation of tetracycline type antibiotics.

In accordance with the present invention, the addition to the fermentation broth of small quantities of an organic compound structurally not related to the tetracycline molecule provokes surprisingly an increase in the yield of the antibiotic by up to 2000 mcg./ml., yielding pharmaceutically useful derivatives of chlortetracycline and tetracycline according to the kind of strain of the fermentation microorganism used, from which the antibiotic chlortetracycline and tetracycline can be liberated. It has been found that surprisingly the yield of the known microorganisms producing chlortetracycline as well as those producing tetracycline will be increased by addition of N,N'-dibenzylethylenediamine to the culture media, independently of the species used.

The object of the present invention is to prepare the pharmaceutically useful DBED complexes of chlortetracycline and tetracycline in pure state by fermentation and to provide improved methods of fermentation of chlortetracycline and tetracycline which are suitable for commercial use.

In accordance with the present invention, there is provided a process for fermentation of a conventional broth, to which a small amount of a compound selected from the group consisting of N,N'-dibenzylethylenediamine and a N,N'-lower-dialkoxydibenzylethylenediamine is added portionwise before and during fermentation, carried out under submerged aerobic conditions at a temperature range of 26° to 30° C. by strains of microorganisms having the capacity to produce antibiotics selected from the group comprising chlortetracycline and tetracycline until a substantial amount of antibiotic activity is conferred upon the broth, comprising furthermore the consecutive steps of preparing the DBED alkaline earth metal complexes in a pure state suitable for pharmaceutical use by recrystallizing the crude DBED complexes—obtained by precipitation at a pH range of 7–9.5 from the previously acidified and filtered broth—from dimethylformamide water solution and liberating the chlortetracycline and tetracycline antibiotics from the respective crude complexes by oxalic acid extraction at a pH range of 1 to 1.6, and the successive and conventional crystallization of the corresponding base of chlortetracycline and tetracycline at a pH range of 3.5 to 5.5.

The fermenting microorganism is a strain having the capacity to produce an antibiotic included in the group of chlortetracycline and tetracycline. Strains of *Streptomyces aureofaciens* (ATCC 10762, ATCC 13908, ATCC 14896, NCIB 8234, NCIB 9122), *Streptomyces viridifaciens* (ATCC 11989), *Streptomyces psammoticus* (IGUP S 4623/33) and *Streptomyces sayamaensis* are suitable for industrial purposes. However, the preferred process is to use *Streptomyces lusitanus* for the production of chlortetracycline and its DBED complex in a conventional chloride ion containing medium and in a chloride ion free medium for the production of tetracycline and its DBED complex. *Streptomyces lusitanus* has been described in "Antibiotics and Chemitherapy"—1962 (pp. 661–668, American Society for Microbiology, Ann Arbor, Mich., 1963) and the original soil isolate is deposited in the American Type Culture Collection—Washington, under No. ATCC 15842; an industrially useful selected live strain descendent of the former in deposited in the National Collection of Industrial Bacteria—Aberdeen, under No. NCIB 9451. It should be noted that, the industrial strains being highly sensitive and unstable, preserved cultures are to be submitted to the conventional selection procedures prior to industrial use.

Another advantage of the present invention—besides the increased yields of fermentation—lies in the fact that water is the sole solvent used during the whole process where chlortetracycline and tetracycline base is prepared. Thus the fire hazard is practically excluded and the most economical solvent is used, whereas in the preparation of the pharmaceutical grade quality of the DBED complexes an organic solvent is used only in the final step.

The culture media conventionally used for chlortetracycline and tetracycline fermentation are suitable. The examples given here below illustrate the composition of such media.

In order to increase yields, DBED is added to the broth before and during fermentation under sterile conditions as a water soluble salt selected from the group comprising di-acetate and di-lactate in a total amount of 0.1 to 2.5 grs. per litre divided into 3 to 6 fractions. A suitable schedule for portionwise addition is at 0, 48, 72, 120 and 130 hours. A preferred way of performing the invention is to add increasing portions of DBED to the broth proportionally to the activity formed. Thus, whereas the first and second fractions are very small amounting to quantities of 20 to 100 mgs./litre, the quantities of successive additions are increased. However, the total amount added should not surpass at the last addition the molecular ratio of 1 mole of DBED and 2 moles of the antibiotic formed. After 140–150 hours the rate of activity formation diminishes and fermentation is stopped.

The fermentation is carried out by known conventional processes under submerged aerobic conditions at a temperature range of 26°–28° C.

Example 1 illustrates the increase in yield of antibiotic formation using various strains of various species in parallel fermentations run without addition of DBED. The values indicate that the variation in the increase of yield depends on the properties of a particular strain rather than on those of a given species. Previous laboratory scale fermentations enable those skilled in the art to find the optimum amount of the fractions of DBED to be added and the time intervals for a particular strain, in the light of the illustration given in the examples.

The fermented broth, once fermentation is stopped—as known in the art—is acidified with 12% sulphuric acid, filtered and the DBED complex is precipitated by adjusting the pH to 7–9.5. As the conventional culture media used in the present process for the tetracycline antibiotic fermentation contain calcium salts, the excess of calcium ions is sequestered by adding ethylenediamine tetraacetate. Addition to the broth of an antioxidant, such as sodium hydrosulfite or formaldehyde sulfoxylate sodium before precipitation of the complex, improves the quality and color of the antibiotic.

The crude DBED calcium complexes of chlortetracycline and tetracycline thus formed are purified by dissolving them in the minimum amount of dimethylformamide necessary. The solution is filtered and the DBED complex precipitated by adding to it 5 times volume/volume of water under stirring. The precipitated complex is filtered, washed with water and dried at 45° C. under vacuum.

The centesimal composition of the anhydrous complex compound corresponds to the molecular composition of $DBED \cdot CTC_2 \cdot Ca$ and $DBED \cdot TC_2 \cdot Ca$. However, complexes of other composition have been isolated specially when the amount of DBED was less than 1 mole for every two moles of antibiotic, having a composition after isolation of 1:4:3.

The "in vitro" activity of the complexes corresponds to that of their tetracycline antibiotic content. "In vivo" they exercise sustained therapeutically useful blood levels for periods over 36 hours. The blood levels were determined in rabbits after a single intramuscular dose of an amount of $DBED \cdot TC_2 \cdot Ca$ suspended in saline equivalent to 100 mg./kg. of tetracycline hydrochloride and as a control 100 mg./kg. of pure tetracycline hydrochloride in buffered saline were injected in another group of rabbits.

| | Number of rabbits | Mcgs. of tetracycline per ml. of plasma after administration (hours) | | | | |
|---|---|---|---|---|---|---|
| | | 1 | 3 | 8 | 24 | 36 |
| $DBED \cdot TC_2 \cdot Ca$ | 6 | 0.7 | 1.3 | 1.6 | 1.6 | 1.1 |
| TC.HCl | 6 | 1.0 | 1.8 | 1.4 | 0.3 | |

The complexes are also suitable as active ingredients for dermatological ointments.

From the crude DBED complexes obtained after alkaline precipitation chlortetracycline and tetracycline respectively can be isolated in pure state by suspending the still wet complex in water and extracting the antibiotic with a 10% oxalic acid solution at pH 1.5. The acid solution is filtered and its pH raised to 6–7 and then decreased to 4–5.5, when the corresponding tetracycline antibiotic crystallizes out in pure pharmaceutical useful state. The addition of sodium hydrosulfite to the solution improves the color of the final product. The thus obtained chlortetracycline and tetracycline correspond to the specification given in U.S. Pharmacopea XV and XVI respectively.

Example 1

40 ml. portions of a culture medium of the following composition:

| | | |
|---|---|---|
| Corn steep liquor (50%) | grs | 25 |
| Peanut meal | grs | 25 |
| Calcium carbonate | grs | 8 |
| Soluble starch (high fluidity) | grs | 61 |
| $(NH_4)_2SO_4$ | grs | 5.5 |
| $NH_4Cl$ | grs | 1.5 |
| $MgSO_4 \cdot 7H_2O$ | gr | 0.05 |
| $COCl_2$ | gr | 0.005 |
| Lard oil | grs | 30 |
| $FeSO_4$ | gr | 0.001 |
| Tap water | cc | 100 | are placed in 300 cc. Erlenmeyer flasks and sterilized at 120° C. for 25 minutes, the pH being 6.2 after sterilization. The flasks are inoculated with 1 cc. of a 24-hour-old culture of the respective microorganism, the composition of this seed medium being as follows:

| | | |
|---|---|---|
| Corn steep liquor | grs | 10 |
| Sucrose | grs | 10 |
| $CaCO_3$ | gr | 1 |
| $(NH_4)_4HPO_4$ | grs | 2 |
| $KH_2PO_4$ | grs | 2 |
| $MgSO_4 \cdot 7H_2O$ | gr | 0.25 |
| Tap water | cc | 1000 | and incubated in a rotary shaker at 28° C. A sterile concentrated aqueous DBED acetate solution is added before and during fermentation as indicated in the annexed table excepting controls and the antibiotic content of broth is determined after 140 hours by standard U.V. assays. The values obtained demonstrate the effectiveness of addition of DBED to the culture media.

Example 2

300 litres sterilized culture medium of the composition as specified in Example 1 are inoculated with 1500 ml. of a 24 hours old seed culture of the composition as specified in Example 1 of a strain of Streptomyces lusitanus NCIB 9451. A sterile concentrated aqueous solution of DBED di-acetate is added to the broth in portions of 20, 50, 70, 230, 630, 1500 mg./litre at 0, 48, 72, 96, 120, 134 hours of submerged aerobic fermentation in an adequate fermentation tank equipped with a stirrer at 26° C., sterilized air being injected at a pressure of 0.5 kg./cm. After 145 hours the activity of the $DBED.CTC_2.Ca$ complex thus formed

TABLE

| Amount of DBED acetate added to the broth expressed in mg./litre | | | | | | Antibiotic content after 140 hours in mcg./ml. expressed as hydrochloride of— | | | | | | | |
|---|---|---|---|---|---|---|---|---|---|---|---|---|---|
| | | | | | | Chlortetracycline | | | | | Tetracycline | | |
| 0 | 48 | 72 | 96 | 120 | 130 | S. aureofaciens NRRL 2209 | S. aureofaciens NRRL 2209, selected strain No. 286 | S. lusitanus NCIB 9451, selection No. AX/502 | S. lusitanus NCIB 9451, selection No. AX/801 | S. sayamaensis selection No. 34 | S. psammoticus selection No. 7 | S. viridifaciens ATCC 11989, selection No. M 99 | S. aureofaciens, prevailing tetracycline producing mutant strain No. M 97 |
| Hours after inoculation | | | | | | | | | | | | | |
| 0 | 0 | 0 | 0 | 0 | 0 | 360 | 3,810 | 7,220 | 8,900 | 3,300 | 5,210 | 4,260 | 1,700 |
| 20 | 50 | 0 | 0 | 0 | 0 | 805 | 4,090 | 7,860 | 9,150 | 3,670 | 5,640 | 4,750 | 2,050 |
| 20 | 50 | 50 | 150 | 280 | 0 | 452 | 4,890 | 8,190 | 9,700 | 3,870 | 5,980 | 5,120 | 2,430 |
| 20 | 50 | 50 | 150 | 500 | 500 | 267 | 4,120 | 8,600 | 10,130 | 2,400 | 6,280 | 4,600 | 1,700 |
| 30 | 50 | 70 | 200 | 1,000 | 1,000 | 180 | 2,840 | 8,810 | 10,400 | 1,800 | 5,990 | 4,370 | 1,950 | is equivalent to 10.9 gr./litre of chlortetracycline hydrochloride. Then 1 gr./litre of sodium hydrosulfite and 1.5 gr./litre of ethylenediamine tetraacetate sodium are added. After separating the mycelium from the broth by filtration of the broth acidified with diluted sulphuric acid at pH 1.0, the activity decreases to 7.6 gr./litre due to dilution. The pH is then adjusted to 8.2 by adding 10% ammonia water. The precipitate thus obtained is filtered, washed with water and well drained. The still wet precipitate weighs 7.9 kg. consisting of crude DBED·CTC$_2$·Ca complex. Subsequently, it is dissolved in a minimum amount of dimethylformamide, the impurities are filtered off and the complex is precipitated in pure state by adding 5 volumes of water to the dimethylformamide solution. The precipitate is filtered, washed with water and dried at 45° C. under vacuum. The desired pure chlortetracycline DBED calcium complex thus obtained is characterized by the following absorption maxima and minima in U.V. light:

Max. 230 m$\mu$ (E$_{1cm.}^{1\%}$ 244); 265 m$\mu$ (E$_{1cm.}^{1\%}$ 270); 305 m$\mu$ (E$_{1cm.}^{1\%}$ 121); 340 m$\mu$ (E$_{1cm.}^{1\%}$ 146); 375 m$\mu$ (E$_{1cm.}^{1\%}$ 164) and min. 240 m$\mu$ (E$_{1cm.}^{1\%}$ 214) 305 m$\mu$ (E$_{1cm.}^{1\%}$ 111) 344 m$\mu$ (E$_{1cm.}^{1\%}$ 134)

In a parallel control fermentation, the addition of DBED has been omitted. The activity of broth corresponded to 9.1 gr./litre expressed in chlortetracycline hydrochloride.

Example 3

300 litres sterilized culture medium of the composition as specified in Example 1 are inoculated with 1500 ml. of a 24 hours old seed culture of the composition as specified in Example 1 of a selected strain descendent of *Streptomyces aureofaciens* NRRL 2209. A sterile concentrated aqueous solution of DBED diacetate is added to the broth in portions of 20, 50, 70, 230, 630 mg./litre at 0, 48, 72, 96, 120 hours of submerged aerobic fermentation in an adequate fermentation tank equipped with a stirrer at 28° C., sterilized air being injected at a pressure of 0.5 kg./cm. After 135 hours the activity of the DBED·CTC$_2$·Ca complex thus formed is equivalent to 6 gr./litre of chlortetracycline hydrochloride. Then 1 g./litre of sodium hydrosulfite and 1.5 g./litre of ethylenediamine tetraacetate sodium are added. After separating the mycelium from the broth by filtration of the broth acidified with diluted sulphuric acid at pH 1.0, the activity decreases to 3.8 gr./litre due to dilution. The pH is then adjusted to 8.2 by adding 10% ammonia water. The precipitate thus obtained is filtered, washed with water and well drained. The still wet precipitate weighs 4.3 kg. consisting of crude DBED·CTC$_2$·Ca complex. Subsequently, the precipitate is reslurried in 10 litres of water and acidified with a 10% aqueous oxalic acid solution to pH 1.6, and the formed calcium oxalate and the impurities are filtered off. The pH of the clear filtrate is adjusted to pH 6.5 with 10% sodium hydroxide and 0.6 gr./litre of sodium hydrosulfite is added. The pH is then decreased to 5.5 with concentrated hydrochloric acid and cooled to +5° C. under stirring. The chlortetracycline base crystallizes out in pure state. It is filtered, washed with water and dried in vacuum. Purity 98.2%.

Example 4

One proceeds as in Example 2, but the microorganism used is a recently selected strain of *Streptomyces viridifaciens* (ATCC 11989). After 145 hours, the activity of the DBED tetracycline calcium complex, thus formed, is equivalent to 5.4 gr./litre of tetracycline hydrochloride. 1 gr./litre of sodium hydrosulfite and 1.2 gr./litre of ethylenediamine tetraacetate are then added. After separating the mycelium from the broth by filtration of the broth acidified with diluted sulphuric acid at pH 1.5, the activity decreases to 3.7 gr./litre due to dilution. The pH is then adjusted to 9.5 by adding 10% ammonia water. The precipitate, thus obtained, is filtered, washed with water and well drained. The still wet precipitate weighs 4.1 kg. consisting of crude DBED·TC$_2$·Ca complex. Subsequently, it is dissolved in a minimum amount of dimethylformamide and the impurities are filtered off. The complex is then precipitated in pure state by adding 5 volumes of water to the solution. The precipitate is then filtered, washed with water and dried under vacuum at 45° C., yielding the desired pure DBED tetracycline calcium complex, which exhibits the following maxima and minima in its U.V. absorption curve:

Max. 358 m$\mu$ (E$_{1cm.}^{1\%}$ 250); 270 m$\mu$ (E$_{1cm.}^{1\%}$ 308) and 215 m$\mu$ (E$_{1cm.}^{1\%}$ 252) and min. 300 m$\mu$ (E$_{1cm.}^{1\%}$ 148); 233 m$\mu$ (E$_{1cm.}^{1\%}$ 131.5) in N/100 H$_2$SO$_4$ Antibiotic activity 880 mcg./mg.

Example 5

6000 litres of a sterilized dechlorinated culture medium of the composition:

|  | Grs. |
|---|---|
| Soya meal | 25 |
| Soluble starch | 45 |
| Caseine digest | 1 |
| NH$_4$NO$_3$ | 3 |
| CaCO$_3$ | 9 |
| Lard oil | 5 |
| Corn steep liquor (chloride free) | 25 | per litre of chloride ion free water are inoculated with 120 litres of a 24 hours old seed culture of a recently selected strain of *streptomyces lusitanus* (NCIB 9451). The seed medium is of the composition as specified in Example 1, but the corn steep liquor and water used are free of chloride ions. A sterile concentrated aqueous solution of DBED di-acetate is added to the broth in portions of 20, 50, 70, 230, 600, 1000 mg./litre at 0, 48, 72, 96, 120 and 135 hours of submerged aerobic fermentation at 28° C., sterilized air being injected at a pressure of 0.5 kg./cm. After 148 hours, fermentation is stopped, the broth is acidified to pH 1.5 with diluted sulphuric acid and filtered. 1.2 gr./litre of ethylenediamine tetraacetate and 0.9 gr./litre of sodium hydrosulfite are added to the filtrate and the pH is raised to 9.5 with 12% ammonia. After stirring for 3 hours, the precipitate formed is filtered and washed with water. The wet precipitate is reslurried in 200 litres of water and acidified with a 10% aqueous oxalic acid solution to pH 1.6, and the formed calcium oxalate and the impurities are filtered off. The pH of the clear filtrate is adjusted to pH 6.5 with 10% sodium hydroxide and 0.6 gr./litre of sodium hydrosulfite is added. The pH is then decreased to 5.5 with concentrated hydrochloric acid and cooled to +5° C. under stirring. The tetracycline base crystallizes out in pure state. It is filtered, washed with water and dried in vacuum. Purity 97.9%. Overall yield 69%.

Example 6

One proceeds as in Example 5, but instead of DBED di-acetate one adds the same amounts of N,N'-di-(p-methoxybenzyl)-ethylenediamine di-lactate to the broth. Purity of the tetracycline thus obtained 99.1%. Overall yield 66%.

What is claimed is:

1. A process for the production of an antibiotic substance selected from the group consisting of chlortetracycline, tetracycline, N,N'-dibenzylethylenediamine and N,N' - lower - dialkoxydibenzylethylenediamine alkaline earth metal complexes of chlortetracycline and tetracycline, which comprises the steps of growing, under submerged aerobic conditions, a culture of a species of Streptomyces which produces an antibiotic selected from the group consisting of chlortetracycline and tetracycline in an aqueous nutrient medium containing assimilable carbon, nitrogen and mineral salts, in the presence of a member selected from the group consisting of N,N'-dibenzylethylenediamine, N,N' - dialkoxydibenzylethylenediamine and the water soluble salts thereof in at least an effective amount, the total of which does not exceed half a mole per mole of the said antibiotic content formed to form the said complexes until a substantial antibiotic activity is imparted to the broth, and recovering said antibiotic substance from said culture medium.

2. A process for the production of N,N'-dibenzylethylenediamine chlortetracycline calcium complex, which comprises the steps of growing, under submerged aerobic conditions, a culture of a species of Streptomyces which produces chlortetracycline in an aqueous nutrient medium containing assimilable carbon, nitrogen and mineral salts, in the presence of N,N'-dibenzylethylenediamine di-acetate, added in fractions before and during fermentation the total amount of which does not exceed half a mole per mole of the chlortetracycline content formed, until a substantial antibiotic activity is imparted to said solution, precipitating the said complex from the filtered acidified broth at pH 6 to 8.5, and recrystallizing the precipitate from dimethylformamide-water.

3. A process for the production of chlortetracycline, which comprises the steps of growing, under submerged aerobic conditions, a culture of a species of Streptomyces which produces chlortetracycline in an aqueous nutrient medium containing assimilable carbon, nitrogen and mineral salts, in the presence of N,N'-dibenzylethylenediamine di-acetate, added in fractions before and during fermentation the total amount of which does not exceed half a mole per mole of the chlortetracycline content formed, until a substantial antibiotic activity is imparted to said solution, precipitating the N,N'-dibenzylethylenediamine chlortetracycline calcium complex from the filtered acidified broth at pH 6 to 8.5, extracting the wet precipitate with an aqueous oxalic acid solution at pH 1.5 and crystallizing chlortetracycline at a pH from 3.2 to 5.5.

4. A process for the production of N,N'-dibenzylethylenediamine tetracycline calcium complex, which comprises the steps of growing, under submerged aerobic conditions, a culture of a species of Streptomyces which produces tetracycline in an aqueous nutrient medium containing assimilable carbon, nitrogen and mineral salts, in the presence of N,N'-dibenzylethylenediamine di-acetate, added in fractions before and during fermentation the total amount of which does not exceed half a mole per mole of the tetracycline content formed, until a substantial antibiotic activity is imparted to said solution, precipitating the said complex from the filtered acidified broth at pH 6 to 9.5, and recrystallizing the precipitate from dimethylformamide-water.

5. A process for the production of N,N'-dibenzylethylenediamine tetracycline calcium complex, which comprises the steps of growing, under submerged aerobic conditions, a culture of a species of Streptomyces which produces tetracycline in an aqueous chloride ion free nutrient medium containing assimilable carbon, nitrogen and mineral salts, in the presence of N,N'-dibenzylethylenediamine di-acetate, added in fractions before and during fermentation the total amount of which does not exceed half a mole per mole of the tetracycline content formed, until a substantial antibiotic activity is imparted to said solution, precipitating the said complex from the filtered acidified broth at pH 6 to 9.5, and recrystallizing the precipitate from dimethylformamide-water.

6. A process for the production of tetracycline, which comprises the steps of growing, under submerged aerobic conditions, a culture of a species of Streptomyces which produces tetracycline in an aqueous nutrient medium containing assimilable carbon, nitrogen and mineral salts, in the presence of N,N'-dibenzylethylenediamine di-acetate, added in fractions before and during fermentation the total amount of which does not exceed half a mole per mole of the tetracycline content formed, until a substantial antibiotic activity is imparted to said solution, precipitating the N,N'-dibenzylethylenediamine tetracycline calcium complex from the filtered acidified broth at pH 6 to 8.5, extracting the wet precipitate with an aqueous oxalic acid solution at pH 1.5 and crystallizing tetracycline at a pH from 3.2 to 5.5.

7. A process for the production of tetracycline, which comprises the steps of growing, under submerged aerobic conditions, a culture of a species of Streptomyces which produces tetracycline in an aqueous chloride ion free nutrient medium containing assimilable carbon, nitrogen and mineral salts, in the presence of N,N'-dibenzylethylenediamine di-acetate, added in fractions before and during fermentation the total amount of which does not exceed half a mole per mole of the tetracycline content formed, until a substantial antibiotic activity is imparted to said solution, precipitating the N,N'-dibenzylethylenediamine tetracycline calcium complex from the filtered acidified broth at pH 6 to 8.5, extracting the wet precipitate with an aqueous oxalic acid solution at pH 1.5 and crystallizing tetracycline at a pH from 3.2 to 5.5.

References Cited
UNITED STATES PATENTS
2,712,517   7/1955   Gourevitch et al. _____ 195—114

FOREIGN PATENTS
91,397   8/1959   Czechoslovakia.

MAURICE W. GREENSTEIN, *Primary Examiner.*